United States Patent [19]

Birks et al.

[11] 4,248,576

[45] Feb. 3, 1981

[54] APPARATUS FOR COATING THERMOPLASTIC FILM

[75] Inventors: Aleck M. Birks, Buffalo Grove, Ill.; Michael I. Haluk, Toronto; Edward M. Rothenberg, Willowdale, both of Canada

[73] Assignee: Canadian Industries Limited, Montreal, Canada

[21] Appl. No.: 47,305

[22] Filed: Jun. 11, 1979

[30] Foreign Application Priority Data

Jun. 14, 1978 [CA] Canada .................................. 305397

[51] Int. Cl.³ .......................... B05C 3/00; B05C 9/04
[52] U.S. Cl. .................... 425/68; 156/244.12; 264/514; 264/173; 425/72 R; 425/95; 425/104; 425/147; 427/173
[58] Field of Search .............. 264/514, 563, 209, 173; 425/94–95, 104, 72 R, 326.1, 68, 96–97, 147; 427/171–173, 434 E, 434 R; 156/244.11, 244.12, 244.21

[56] References Cited

U.S. PATENT DOCUMENTS

| 3,160,917 | 12/1964 | Berggren et al. | 264/209 |
| 3,160,918 | 12/1964 | Berggren et al. | 264/209 |
| 3,170,011 | 2/1965 | Cheney et al. | 264/209 |
| 3,193,547 | 7/1965 | Schott, Jr. | 264/209 |
| 3,576,658 | 4/1971 | Notomi et al. | 264/565 |
| 3,709,642 | 1/1973 | Stannard | 264/173 |
| 3,822,333 | 7/1974 | Haruta et al. | 264/209 |

*Primary Examiner*—Jeffery R. Thurlow
*Attorney, Agent, or Firm*—Guy Drouin

[57] ABSTRACT

A method and an apparatus for effecting in a continuous manner the three operations of extruding, biaxially stretching and surface coating a seamless tubing of thermoplastic resin such as polyethylene, polypropylene, polyethylene terephthalate, etc. The coating material in a molten state is applied to the tubing while a formative state and prior stretching. A coated film is obtained which is dimensionally stable and is useful for food packaging.

2 Claims, 1 Drawing Figure

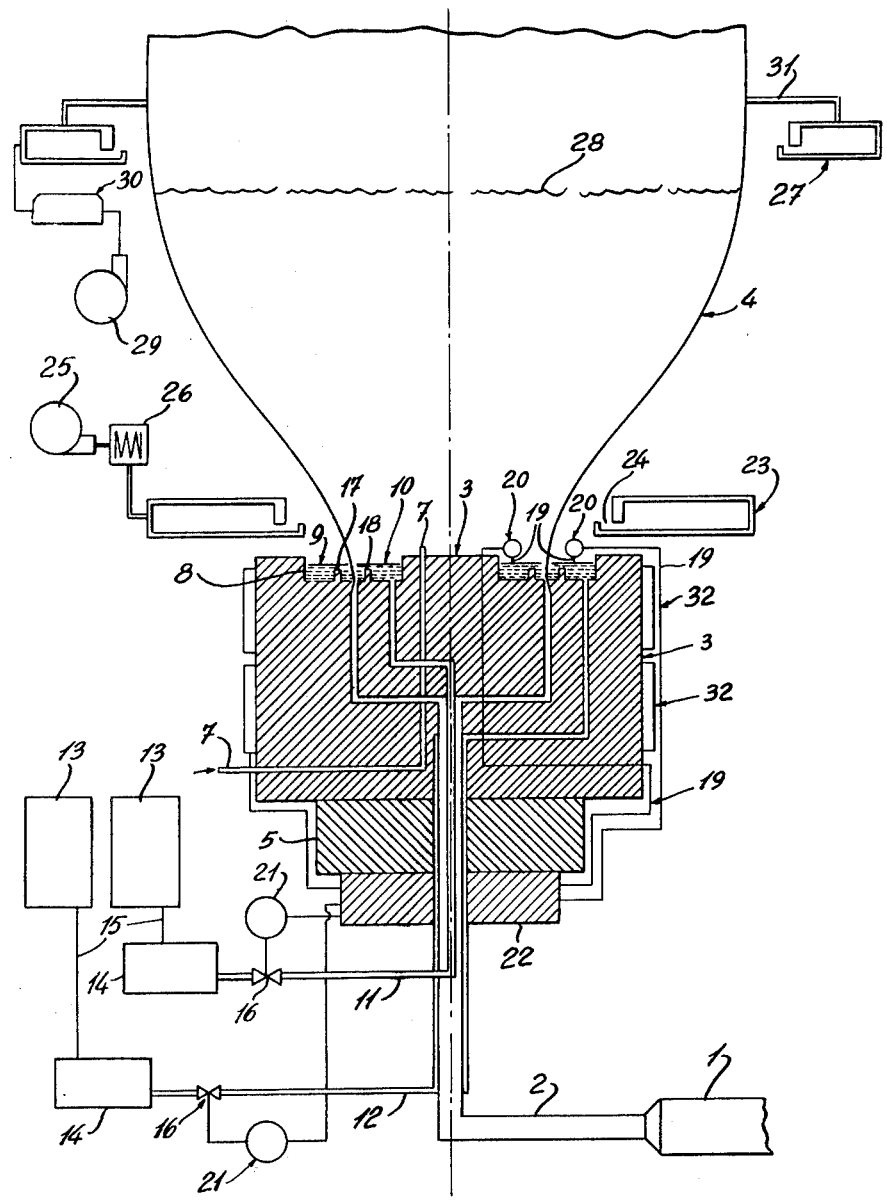

APPARATUS FOR COATING THERMOPLASTIC FILM

This invention relates generally to the art of making coated thermoplastic film. More particularly, the invention relates to a method and an apparatus for forming uniform, ultra-thin coatings on biaxially stretched thermoplastic film as an integral step in the production of such film.

Films made of polyethylene, polypropylene, polyethylene terephthalate or other thermoplastic resins are in great demand in the packaging industry because of their great strength and toughness, especially when they have been biaxially stretched. However, such films happen to possess certain surface characteristics which make them unsuitable or less desirable for a number of particular end-uses. It has thus become necessary and it is now customary to treat or modify one or both surfaces of the films so as to make them suitable for said particular end-uses.

Several methods have been proposed to modify the properties or surface characteristics of thermoplastic films. One method consists in the formation of a laminated structure in which two or more layers of different thermoplastic films are adhered together. Thus two or more layers of preformed thermoplastic films may be bonded together by means of a suitable adhesive interlayer. Another method of achieving a desirable combination of surface properties is to coat a preformed thermoplastic film on one or both surfaces with a layer of polymeric material applied as a melt, or, alternatively, as a solution or dispersion in a suitable volatile solvent or dispersant. The present invention is concerned with the technique whereby the coating material is applied as a melt.

In order to coat thermoplastic films with a coating material in a molten state, it has heretofore been proposed to proceed by the conventional dip and doctor-knife technique commonly used for coating paper. This technique, which may be satisfactory in certain circumstances, has proved to be improper where the coating materials are of the type which gradually migrate into the base film. This gradual migration results in a dimensional expansion of the coated film, which, after a certain period of storage, may become useless. To overcome this problem of the conventional technique, it is proposed in U.S. Pat. No. 3,751,281 to stretch the base film as it is dipped into the molten coating material. Although resulting in an acceptable product, this modified method suffers from the economical disadvantage that it is a two stage process.

It is thus an object of this invention to provide a method and an apparatus for producing dimensionally stable surface coated thermoplastic resin films suitable for use in packaging applications.

It is another object of this invention to provide a method and an apparatus for surface coating extruded thermoplastic films as an intergral step in the film forming operation.

It is a further object of this invention to provide a method and an apparatus for effecting in a continuous manner the three operations of extruding, biaxially stretching and surface coating a seamless tubing of thermoplastic resin.

The foregoing and additional objects will become apparent from the following description, taken in conjunction with the accompanying drawing and attached claims.

The method, according to the invention, comprises:
(a) continuously extruding a thermoplastic resinous material while in a molten state upwardly through an annular die to form a seamless tube;
(b) contacting at least one surface of the tube on emergence from the die and while in the formative plastic state with a molten resinous coating material having a viscosity of, preferably between 50 and 2000 centipoises at 300° F., whereby a layer of the coating material is deposited on said surface;
(c) providing a gas at a controlled velocity and temperature and impinging it circumaferentially on the coated tube while the latter is still in the formative plastic state, whereby to stabilize the tube and to control the temperature of the coating layer;
(d) drawing the tube upwardly away from the die at a speed greater than that at which it is extruded whereby said tube and the coating thereon are stretched longitudinally while both are still in the formative plastic state;
(e) flattening the tube at a point spaced from the point of extrusion where both the material of the tube and the material of the coating have set; and
(f) expanding the tube by means of a substantially constant volume of gas trapped within the tube between the point of extrusion and the point of flattening and having a pressure greater than the pressure outside the tube, whereby both said tube and the coating layer thereon, while still in the formative plastic state, are expanded and stretched transversely to their travelling direction.

The method is not restricted to any particular apparatus. It, for instance, can be carried out in the apparatus described hereinbelow which, in general terms, comprises:
(A) an upwardly oriented extrusion die having an annular extrusion orifice, adapted to receive molten thermoplastic material for extrusion purposes;
(B) an extruder for continuously extruding molten thermoplastic material from the die to form a seamless tube;
(C) a trough-like reservoir directly located on the face of the extrusion die for holding a pool of molten thermoplastic coating material, said reservoir spanning and fully embodying the annular extrusion orifice and being divided by the seamless tube emerging from said orifice into two concentric portions;
(D) means for feeding molten thermoplastic coating material separately and individually to each of said two portions of the reservoir;
(E) means immediately above the reservoir for blowing a gas at a controlled temperature and pressure circumferentially around the outer surface of the extruded seamless tube while in a formative plastic state;
(F) means at a distance above the die face for flattening the tube once it has set;
(G) means downstream of said flattening means to withdraw the tube from the die orifice at a controlled speed; and
(H) means to introduce a gas at controlled superatmospheric pressure into the tube whereby to inflate it between the points of extrusion and of flattening.

The invention will be more fully described with reference to the accompanying drawing which illustrates in sectional view, an embodiment of an apparatus according to the invention.

Referring to the drawing, reference numeral 1 represents an extruder of conventional design from which a melt of thermoplastic resinous material is extruded through an adapter 2 and an upwardly oriented die 3 in the form of a seamless tubing 4. Die 3 suitably equipped with heater 32 is preferably combined with a rotator or oscillator 5, also of conventional design, which, as is well known, serves to improve the quality of rolls of film produced by blow extrusion. The seamless tubing 4 is inflated to form a bubble generally indicated at 6, by means of a gas such as air introduced through passageway 7. At a point vertically above the face of the die 3, where the tubing and any coating material previously applied thereon have set, means (not shown) of standard construction are provided for flattening the tubing and withdrawing it from the die.

Cut into the face of the die 3, there is an annular recess generally indicated at 8, the bottom of which spans and fully embodies the die orifice. Upon emergence from the die orifice, tubing 4 divides the space within recess 8 into two independent concentric troughs 9 and 10, each adapted to hold a pool of molten thermoplastic resinous coating material. Troughs 9 and 10, being independent, can be used one at a time or simultaneously depending upon whether it is desired to coat only one or the two surfaces of tubing 4. The fact that troughs 9 and 10 are separate and independent offers the advantage that they can contain different coating materials.

Separate passageways 11 and 12 are provided for feeding molten thermoplastic resinous coating material or materials individually to troughs 9 and 10 respectively. Two separate but identical systems are used to feed the molten coating material to passageways 11 and 12 and such are described using same reference numerals to indicate similar parts. Each system comprises a melter 13 for melting solid coating material, a homogenizer 14 linked to melter 13 by line 15 to homogenize the molten material and a valve 16 through which the homogenized molten material is fed to either one of passageways 11 and 12. Troughs 9 and 10 are preferably provided with baffles 17 and 18, respectively, which serve to prevent the stability of bubble 6 being disturbed by the streams of coating materials coming out of passageways 11 and 12.

The level of molten coating material in each of troughs 9 and 10 has been found to be very important. An insufficient level, for instance, may result in the coating material being applied in insufficient thickness while an excessive level may cause bubble 6 to collapse. Thus, in order to supply, continuously, the desired amount of coating material to each of troughs 9 and 10 and to maintain the level of such coating material in each of said troughs, it has been found preferable to use level-control systems. Such systems, one for each of troughs 9 and 10, may be such as illustrated in the drawing and may each consist of a thermocouple 19 embedded in a heat sink 20. When the level of coating material in a trough gets too low, the heat sink 20 of this trough rapidly cools thermocouple 19 to a temperature below the melt temperature of the coating material, and the thermocouple 19 signals a solenoid 21 to open valve 16. Contact between thermocouple 19 and solenoid 21 is assured by a contactor 22 of conventional design. At the same time as valve 16 is opened, a pump (not shown) is activated whereby molten coating material is pumped to one or both of troughs 9 or 10 until the level of material therein reaches the end of thermocouple 19. The latter is then heated up by the coating material and signals the solenoid 21 to close valve 16. The position of the end of thermocouple 19 can, of course, be adjusted so as to obtain any desired level of coating material in the trough.

A ring 23 generally known as an "air ring", having an annular slot 24 is provided immediately above the face of die 3 for impinging a stream of a gaseous medium, usually air, at controlled pressure and temperature, circumferentially around freshly coated tubing 4 while still in a formative plastic state. The gaseous medium is supplied to ring 23 by blower 25 and its temperature is set by heater 26. The stream of gaseous medium serves to stabilize bubble 6 and to control the temperature of the freshly deposited layer of coating material on tube 4.

Although this is not essential, it is sometimes advantageous to provide a secondary air ring such as indicated at 27 for cooling the coated tube 4 above frost line 28, i.e. above the point at which tube 4 starts to set. Air ring 27 is preferably surmounted by an iris diaphragm 31 of well known design. Air for ring 27 is fed by means of blower 29 and cooled by passage through chiller 30. While serving to further stabilize the bubble 6, this second air ring has for its main purpose to cool the tubular film 4 whereby to prevent distortion and blockage thereof.

Generally, the height of molten coating material in the troughs 9 and/or 10 is so adjusted that the coating is applied before the thermoplastic substrate has undergone any stretch. However, in certain circumstances such as when a relatively thicker coating is desired, the height of coating material in the trough may be such that application of the coating occurs at a point wherein the thermoplastic substrate has already undergone some stretch.

Where it is desired to obtain a somewhat thinner coating layer, one may resort to suitable means, well known to those versed in the art, whereby the extruded thermoplastic substrate is constrained to assume a smaller tube diameter compared to the die, prior to its emergence from the pool of molten coating medium.

Parameters other than the height of coating material in troughs 9 and 10 may be used to control the thickness of the coating layer. Examples of such parameters are: the rate of film cooling, the temperature and viscosity of the coating compound as well as the blow up and draw down ratios.

Thermoplastic resins suitable for use as substrate in the present invention are resins which are capable of being extruded into the form of a self-supporting film. Examples of such resins are low density polyethylene, high density polyethylene, polyethylene terephthalate, polypropylene, phenoxy resins, vinyl resins and polystyrene.

As regards the coating materials which can be applied to the above-defined substrates by the method and apparatus of the invention, they are any thermoplastic resins blends or compositions which have the property of adhering to the hot resin substrate and which, at 300° F., have a viscosity in the range of 50 to 2000 centipoises. Because of the vast number of possible combinations, it should be readily understood that it is not possible to provide an exhaustive list of all the blends suitable for use as coating material. Thus, the specific blends mentioned hereinbelow are merely illustrative examples and should not be construed as being limiting in any respect. Such specific blends were prepared from the following:
1. "Elvax" 210—Trademark for an ethylenevinylacetate copolymer resin (27% to 29% by weight vinyl acetate, manufactured by E. I. du Pont de Nemours and Company, Inc.)
2. "Piccotex" 120—trade mark for a copolymer of alphamethyl styrene and vinyl toluene, manufactured by Pennsylvania Industrial Chemical Corp.
3. CIL 01500—a low molecular weight polyethylene resin produced by Canadian Industries Limited.
4. "Epolene" C-10—trade mark for a low molecular weight polyethylene resin produced by Eastman Chemical Company Limited.
5. "Nirez" 1115—trade mark for a polyterpene resin supplied by Reichhold Chemicals.
6. Paraffin Wax 1245—a paraffin wax with a melting range of 142° F. to 145° F. produced by Bareco Division of the Petrolite Corporation.
7. BHT—butylated hydroxy toluene antioxidant manufactured by Eastman Chemical Company Limited.

The following examples are illustrative of the practice of the invention. All parts and percentages are by weight unless otherwise indicated.

EXAMPLE 1

Coating of a Blown High Density Polyethylene Film

An Egan extruder was employed having a 3½ inch diameter and an L/D of 28. As the substrate resin, there was used "Sclair" 19A (A Du Pont trademark for high density polyethylene of density −0.96 and melt index −0.8). The resin was brought to a molten state and fed from the extruder to the die by means of an adapter which formed an angle of approximately 90°. The die was a bottom-fed, spiral variety having an annular orifice of 14 inches and a gap of 0.040 inch. Conventional downstream equipment was employed.

The coating material consisted of the following composition:
"Elvax" 210—25%
"Piccotex" 120—10%
CIL 01500 resin—7.5%
Paraffin Wax—57.5%

The blend, characterized by a viscosity of 780 centipoises at 310° F., was melted and continuously fed to trough 10 where a pool thereof was maintained at constant height and at constant temperature of about 325° F. The coating material adhered to the interior surface of the hot tubular film substrate as the latter was continuously extruded. As the adhering molten coating was carried upward on the interior surface of the extruded tubular film, both the latter and the coating layer were stretched longitudinally and transversely. There resulted a product with a coating layer having a basis weight of 11.1 lb/ream which is equivalent to a thickness of 0.8 mil. For most applications, this coating thickness can be considered as excessive. The blend, however, was smooth and even and applied easily onto the substrate.

EXAMPLE 2

The same equipment and substrate were employed as indicated in Example 1. In this instance, the blend consisted of the following composition.
"Elvax" 210—19.1%
"Piccotex" 120—7.6%
CIL 01500—5.8%
Paraffin Wax—67.5%

The coating procedure was generally the same as in Example 1. The blend which had a viscosity of 350 centipoises at 266° F. resulted in a coating having a basis weight of 3.07 lbs/ream which corresponds to a coating thickness of 0.20 mil. There resulted a product with a smooth, glossy coating imparting sufficient heat-seal strength for packaging products of approximately 10 once weight.

EXAMPLE 3

Using the same equipment, substrate and coating procedures as in Example 1, a coating thickness still lower than in Example 2, was obtained by using the following blend.
"Elvax" 210—10.3%
"Piccotex" 120—4.1%
CIL 01500—3.1%
Paraffin Wax—82.5%

This blend had a viscosity of 45 centipoises at 270° F. and provided a coating with a basis weight of 1.41 lbs/reams for a thickness of 0.1 mil. Coating thicknesses below 0.1 mil give rise to deterioration of seal strength.

The coating obtained in this example exhibited satisfactory surface characteristics and a seal strength sufficient for products of 5 ounce weight.

In general, the process of the invention was found to perform satisfactorily with coating blends having the following compositions:
"Elvax" 210—10%-20%
"Piccotex" 120—4%-10%
CIL 01500—3%-7.5%
Paraffin Wax—83%-57.5%

EXAMPLE 4

For increased hot-tack strength, the following blend containing additional tackifiers was employed:
"Elvax" 210—22.5%
"Piccotex" 120—12.5%
"Epolene" C-10—4.0%
"Nirez" 1115—10.0%
Paraffin Wax—50.9%
BHT—0.1%

Applied with the same equipment, substrate and coating procedure as indicated in Example 1, the blend resulted in a coated product having adequate strength for packaging goods weighing about 13 ounces.

What we claim is:
1. An apparatus for applying coating to thermoplastic film comprising:
(A) an upwardly oriented extrusion die having an annular extrusion ofifice; adapted to receive molten thermoplastic material for extrusion purposes;
(B) an extruder for continuously extruding molten thermoplastic material from the die to form a seamless tube;
(C) a trough-like reservoir directly located on the face of the extrusion die for holding a pool of molten thermoplastic coating material, said reservoir spanning and fully embodying the annular extrusion orifice and being divided by the seamless tube emerging from said orifice into two concentric portions;
(D) means for feeding molten thermoplastic coating material separately and individually to each of said two portions of the reservoir;

(E) means immediately above the reservoir for blowing a gas at a controlled temperature and pressure circumferentially around the outer surface of the extruded seamless tube;

(F) means at a distance above the die face for flattening the tube once it has set;

(G) means downstream of said flattening means to withdraw the tube from the die orifice at a controlled speed, and (H) means to introduce a gas at controlled superatmospheric pressure into the tube whereby to inflate it between the points of extrusion and of flattening.

2. An apparatus as claimed in claim 1 including means to control the level of molten coating material in each of the two portions of the reservoir.

* * * * *